(12) United States Patent
Kim et al.

(10) Patent No.: US 12,394,222 B2
(45) Date of Patent: Aug. 19, 2025

(54) METHODS AND APPARATUSES FOR ANALYZING FOOD USING IMAGE CAPTIONING

(71) Applicant: NUVI LABS CO., LTD., Incheon (KR)

(72) Inventors: Dae Hoon Kim, Seoul (KR); Jey Yoon Ru, Seoul (KR); Seung Woo Ji, Seoul (KR)

(73) Assignee: NUVI LABS CO., LTD., Incheon (KR)

( * ) Notice: Subject to any disclaimer, the term of this patent is extended or adjusted under 35 U.S.C. 154(b) by 322 days.

(21) Appl. No.: 18/090,391

(22) Filed: Dec. 28, 2022

(65) Prior Publication Data

US 2024/0153287 A1    May 9, 2024

(30) Foreign Application Priority Data

Nov. 4, 2022  (KR) .................. 10-2022-0145991

(51) Int. Cl.
| | | |
|---|---|---|
| *G06K 9/00* | (2022.01) | |
| *G06F 16/583* | (2019.01) | |
| *G06T 7/11* | (2017.01) | |
| *G06V 10/82* | (2022.01) | |
| *G06V 20/68* | (2022.01) | |
| *G06V 20/70* | (2022.01) | |

(52) U.S. Cl.
CPC ............ *G06V 20/68* (2022.01); *G06F 16/583* (2019.01); *G06T 7/11* (2017.01); *G06V 10/82* (2022.01); *G06V 20/70* (2022.01); *G06T 2207/30128* (2013.01)

(58) Field of Classification Search
None
See application file for complete search history.

(56) References Cited

U.S. PATENT DOCUMENTS

| | | | | |
|---|---|---|---|---|
| 9,311,568 B1* | 4/2016 | Feller | ..................... | G06V 20/62 |
| 9,659,225 B2* | 5/2017 | Joshi | ..................... | G06Q 50/12 |
| 9,892,501 B2* | 2/2018 | Dehais | ..................... | G06T 7/521 |
| 9,977,980 B2* | 5/2018 | Joshi | ..................... | G06Q 50/12 |
| 10,380,174 B2* | 8/2019 | Bhagwan | ............ | G06F 16/5866 |
| 11,322,149 B2* | 5/2022 | Kim | ..................... | G06F 40/30 |
| 11,594,050 B2* | 2/2023 | DeSantola | ..... | G06Q 10/063112 |
| 11,672,446 B2* | 6/2023 | Hadad | ............... | G06F 16/90324 |
| | | | | 600/365 |

(Continued)

FOREIGN PATENT DOCUMENTS

| | | | | |
|---|---|---|---|---|
| CN | 105512501 A | * | 4/2016 | |
| CN | 108830154 A | * | 11/2018 | ......... G06K 9/00664 |

OTHER PUBLICATIONS

Channam et al., "Extraction of Recipes from Food Images by Using CNN Algorithm," 2021 Fifth International Conference on I-SMAC (IoT in Social, Mobile, Analytics and Cloud) (I-SMAC), Palladam, India, 2021, pp. 1308-1315 (Year: 2021).*

(Continued)

*Primary Examiner* — Feng Niu
(74) *Attorney, Agent, or Firm* — Maschoff Brennan

(57) ABSTRACT

Provided are a method and an apparatus for analyzing food using image captioning. A method for analyzing food using image captioning according to one embodiment of the present disclosure comprises generating image captioning data using food image features extracted from a food image; and generating a food name for the food image using the generated image captioning data.

10 Claims, 9 Drawing Sheets

(56) References Cited

U.S. PATENT DOCUMENTS

| | | | | |
|---|---|---|---|---|
| 11,712,633 | B2* | 8/2023 | Yu | G06V 20/70 |
| | | | | 382/159 |
| 11,942,208 | B2* | 3/2024 | Starson | G16H 20/60 |
| 12,064,697 | B2* | 8/2024 | Yu | G06V 20/70 |
| 2016/0163037 | A1* | 6/2016 | Dehais | G06T 7/521 |
| | | | | 382/110 |
| 2019/0290172 | A1* | 9/2019 | Hadad | A61B 5/14532 |
| 2019/0295440 | A1* | 9/2019 | Hadad | G06F 40/295 |
| 2021/0118447 | A1* | 4/2021 | Kim | G10L 15/22 |
| 2021/0166077 | A1* | 6/2021 | Yu | A63F 13/213 |
| 2021/0365687 | A1* | 11/2021 | Starson | G06V 30/412 |
| 2022/0292853 | A1* | 9/2022 | DeSantola | G06V 10/765 |
| 2023/0196802 | A1* | 6/2023 | Gong | G06V 20/68 |
| | | | | 382/110 |
| 2023/0222821 | A1* | 7/2023 | Delp, III | G06V 10/44 |
| | | | | 382/110 |
| 2023/0321550 | A1* | 10/2023 | Yu | G06V 10/7788 |
| | | | | 382/159 |
| 2024/0087345 | A1* | 3/2024 | Estrada Diaz | G06V 20/50 |

OTHER PUBLICATIONS

Kumari et al., "Food Image to Cooking Instructions Conversion Through Compressed Embeddings Using Deep Learning," 2019 IEEE 35th International Conference on Data Engineering Workshops (ICDEW), Macao, China, 2019, pp. 81-84 (Year: 2019).*

Jelodar et al., "Calorie Aware Automatic Meal Kit Generation from an Image." arXiv preprint arXiv:2112.09839 (2021). (Year: 2021).*

Li et al., "Picture-to-amount (pita): Predicting relative ingredient amounts from food images." In 2020 25th International Conference on Pattern Recognition (ICPR), pp. 10343-10350. IEEE, 2021. (Year: 2020).*

Mezgec et al., "NutriNet: A Deep Learning Food and Drink Image Recognition System for Dietary Assessment." Nutrients 9, No. 7 (2017): 657. (Year: 2017).*

Ruede et al., "Multi-Task Learning for Calorie Prediction on a Novel Large-Scale Recipe Dataset Enriched with Nutritional Information," 2020 25th International Conference on Pattern Recognition (ICPR), Milan, Italy, 2021, pp. 4001-4008 (Year: 2021).*

Yang et al., "Yum-me: a personalized nutrient-based meal recommender system." ACM Transactions on Information Systems (TOIS) 36, No. 1 (2017): 1-31. (Year: 2017).*

Vasiloglou et al., "Assessing Mediterranean Diet Adherence with the Smartphone: The Medipiatto Project. Nutrients." Dec. 7, 2020; 12(12):3763. doi: 10.3390/nu12123763. PMID: 33297550; PMCID: PMC7762404. (Year: 2020).*

Machine translation of CN 105512501 A (Year: 2016).*

Machine translation of CN 108830154 A (Year: 2018).*

Min et al., "A survey on food computing." ACM Computing Surveys (CSUR) 52, No. 5 (2019): 1-36. (Year: 2019).*

Shao et al., "Towards the creation of a nutrition and food group based image database." arXiv preprint arXiv:2206.02086 (2022). (Year: 2022).*

Min et al., "Being a Supercook: Joint Food Attributes and Multimodal Content Modeling for Recipe Retrieval and Exploration," in IEEE Transactions on Multimedia, vol. 19, No. 5, pp. 1100-1113, May 2017 (Year: 2017).*

Wang et al., "Cross-Modal Food Retrieval: Learning a Joint Embedding of Food Images and Recipes With Semantic Consistency and Attention Mechanism," in IEEE Transactions on Multimedia, vol. 24, pp. 2515-2525, 2022 (Year: 2022).*

Hakguder et al., "Smart Diet Management through Food Image and Cooking Recipe Analysis," 2022 IEEE International Conference on Bioinformatics and Biomedicine (BIBM), Las Vegas, NV, USA, 2022, pp. 2603-2610 (Year: 2022).*

Chu et al., "Food image description based on deep-based joint food category, ingredient, and cooking method recognition," 2017 IEEE International Conference on Multimedia & Expo Workshops (ICMEW), Hong Kong, China, 2017, pp. 109-114 (Year: 2017).*

Carvalho et al., "Images and Recipes: Retrieval in the Cooking Context," 2018 IEEE 34th International Conference on Data Engineering Workshops (ICDEW), Paris, France, 2018, pp. 169-174 (Year: 2018).*

Zhang et al., "Sequential Learning for Ingredient Recognition From Images," in IEEE Transactions on Circuits and Systems for Video Technology, vol. 33, No. 5, pp. 2162-2175, May 2023 (date of publication: Nov. 1, 2022). (Year: 2022).*

Mao et al., "Visual Aware Hierarchy Based Food Recognition." arXiv e-prints (2020): arXiv-2012. (Year: 2020).*

Wu et al., "A large-scale benchmark for food image segmentation." In Proceedings of the 29th ACM international conference on multimedia, pp. 506-515. 2021. (Year: 2021).*

Wang et al., "Learning Structural Representations for Recipe Generation and Food Retrieval." arXiv preprint arXiv:2110.01209 (2021). (Year: 2021).*

Salvador, A. et al., "Inverse Cooking: Recipe Generation From Food Images," IEEE/CVF Conference on Computer Vision and Pattern Recognition (CVPR), pp. 10445-10454 (2019).

Radford, A. et al., "Learning Transferable Visual Models From Natural Language Supervision," Proceedings of the 38th International Conference on Machine Learning, PMLR, vol. 139, (2021).

Chhikara, P. et al., "FIRE: Food Image to Recipe Generation," arXiv, (2023).

Ma, Z. et al., "Food-500 Cap: A Fine-Grained Food Caption Benchmark for Evaluating Vision-Language Models," Proceedings of the 31st ACM International Conference on Multimedia, pp. 5674-5685 (2023).

Extended European Search Report dated Apr. 12, 2024 as received in Application No. 23210766.4.

* cited by examiner

METHODS AND APPARATUSES FOR ANALYZING FOOD USING IMAGE CAPTIONING

CROSS-REFERENCE TO RELATED APPLICATIONS

This application claims benefit of priority to Korean Patent Application No. 10-2022-0145991 filed on 4 Nov. 2022 in the Korean Intellectual Property Office, the disclosure of which is incorporated herein by reference in its entirety.

TECHNICAL FIELD

The present disclosure relates to a method and apparatus for analyzing food.

BACKGROUND ART

Recently, interest in health has been growing, but on the other hand, people suffering from overweight or obesity are also gradually increasing. Overweight or obesity is a serious problem that causes various diseases, such as diabetes and high blood pressure.

Therefore, to solve overweight or obesity, one's eating habits should be analyzed first. People generally know their likes and dislikes but don't remember what and how often they actually eat. Therefore, to analyze one's own eating habits, it is necessary to identify the food actually consumed and to analyze the individual's eating habits according to the information on the identified foods.

However, since most current technologies use a food image taken through a camera for a simple image search, the search accuracy is considerably low. Moreover, since the accuracy of food type identification in the image search is low, a resulting error increases in the following steps, such as calorie counting.

On the other hand, deep learning is being applied to the image identification stage to solve the problem above, but the recent deep learning technology reveals significant problems. A typical image classification model is effective only for classifying previously learned images. In other words, the classification accuracy for a new image not learned before is lower than that obtained from the classification of images completed for pre-learning.

Here, a deep learning model applied to the food domain may extract a food name from a food image. However, since a food name is arbitrarily chosen by the person who makes the food, conventional learning schemes using predetermined classes have a limit to increasing the classification accuracy. For example, new food combinations that combine existing foods are steadily coming out, such as mint chocolate chicken that combines mint chocolate and chicken.

On the other hand, image captioning is a field in which an AI model recognizes an image, extracts features of the image, and produces an appropriate description, that is, text that a human may easily recognize.

However, even from the human point of view, if several people are asked to look at and explain the same image, a number of different descriptions are bound to come out. Therefore, conventional image captioning methods commonly insert N captions into one image as labels.

Suppose the image captioning technology is applied to food images. Conventional methods of image captioning technology have a problem in that labeling cost becomes high, and it takes considerable work to write multiple captions per food image.

Moreover, since similar-looking food images are highly likely to produce the same caption multiple times, an adverse effect may be caused in learning AI models.

SUMMARY

Embodiments of the present disclosure are intended to provide a method and apparatus for analyzing food using image captioning for accurately generating a food name from a food image using image captioning.

However, the technical problem to be solved by the present disclosure is not limited to the above but may be extended to other various problems belonging to the scope not departing from the technical principles and domain of the present disclosure.

According to one embodiment of the present disclosure, a method for analyzing food executed by an apparatus for analyzing food comprises generating image captioning data using food image features extracted from a food image; and generating a food name for the food image using the generated image captioning data.

The generating image captioning data may generate image captioning data including food ingredients using food image features extracted from the food image.

The generating image captioning data may infer food ingredients using food image features extracted from the food image and generate image captioning data including food recipes for the food image using the inferred food ingredients.

The generating image captioning data may extract a first embedding having food image features through an image encoder to which the food image is input and generate image captioning data including food ingredients for the food image by inputting the extracted first embedding to a first text decoder.

The generating image captioning data may extract a second embedding having food ingredient features through a second text encoder to which the inferred food ingredients are input and generate image captioning data including food recipes for the food image by combining the first embedding having the extracted food image features and the extracted second embedding and inputting the combination to the second text decoder.

The generating a food name may extract a third embedding having food recipe features through a third text encoder to which the generated food recipe is input and generate a food name for the food image by combining the extracted first, second, and third embeddings and inputting the combination to the third text decoder.

The image encoder, the second text encoder, and the third text encoder may be pre-learned using contrastive learning based on contrastive cost.

The image encoder, the second text encoder, and the third text encoder may be learned so that a triplet of the first to third embeddings for the same food image, food ingredient, and food recipe is more similar to each other than a triplet of embeddings for different food images, food ingredients, and food recipes.

The method may further include analyzing food nutrients in the food image using at least one of the inferred food ingredient, the generated food recipe, and the generated food name.

Meanwhile, according to another embodiment of the present disclosure, an apparatus for analyzing food using image captioning may be provided, the apparatus comprising a memory storing one or more programs; and a processor executing the one or more programs stored, wherein the processor is configured to generate image captioning data using food image features extracted from a food image; and generate a food name for the food image using the generated image captioning data.

The processor may generate image captioning data including food ingredients using food image features extracted from the food image.

The processor may infer food ingredients using food image features extracted from the food image and generate image captioning data including food recipes for the food image using the inferred food ingredients.

The processor may extract a first embedding having food image features through an image encoder to which the food image is input and generate image captioning data including food ingredients for the food image by inputting the extracted first embedding to the first text decoder.

The processor may extract a second embedding having food ingredient features through a second text encoder to which the inferred food ingredients are input and generate image captioning data including food recipes for the food image by combining the first embedding having the extracted food image features and the extracted second embedding and inputting the combination to the second text decoder.

The processor may extract a third embedding having food recipe features through a third text encoder to which the generated food recipe is input and generate a food name for the food image by combining the extracted first, second, and third embeddings and inputting the combination to the third text decoder.

The image encoder, the second text encoder, and the third text encoder may be pre-learned using contrastive learning based on contrastive cost.

The image encoder, the second text encoder, and the third text encoder may be learned so that a triplet of the first to third embeddings for the same food image, food ingredient, and food recipe is more similar to each other than a triplet of embeddings for different food images, food ingredients, and food recipes.

The processor may analyze food nutrients in the food image using at least one of the inferred food ingredient, the generated food recipe, and the generated food name.

The present disclosure may provide the following effects. However, since it is not meant that a specific embodiment has to provide all of or only the following effects, the technical scope of the present disclosure should not be regarded as being limited by the specific embodiment.

Embodiments of the present disclosure may correctly generate a food name from a food image using image captioning.

Embodiments of the present disclosure may infer food ingredients from a food image and generate a food recipe and a food name sequentially using image captioning.

Embodiments of the present disclosure may generate a more accurate food name by performing a process of sequentially generating captions for food ingredients, a food recipe (e.g., descriptions of a food cooking process), and a food name.

Embodiments of the present disclosure may accurately analyze food nutrients in the food image using not only food image features but also at least one of inferred food ingredients, a generated food recipe, and a generated food name.

DESCRIPTION OF EXEMPLARY EMBODIMENTS

Since the present disclosure may be modified in various ways and may provide various embodiments, specific embodiments will be depicted in the appended drawings and described in detail with reference to the drawings. However, it should be understood that the specific embodiments are not intended to limit the gist of the present disclosure; rather, it should be understood that the specific embodiments include all of the modifications, equivalents, or alternatives belonging to the technical principles and scope of the present disclosure. In describing the present disclosure, if it is determined that a detailed description of a related art incorporated herein unnecessarily obscure the gist of the present disclosure, the detailed description thereof will be omitted.

Terms such as "first" and "second" may be used to describe various constituting elements, but the constituting elements should not be limited by the terms. The terms are introduced to distinguish one element from the others.

The technical terms used in the present disclosure have been introduced solely for the purpose of describing a specific embodiment, and it should be noted that the terms are not intended to restrict the technical scope of the present disclosure. Terms used in the present disclosure have been selected as much as possible from general terms relevant to the functions of the present disclosure and currently in wide use; however, the selection of terms may be varied depending on the intention of those persons skilled in the corresponding field, precedents, or emergence of new technologies. Also, in a particular case, some terms may be selected arbitrarily by the applicant, and in this case, detailed definitions of the terms will be provided in the corresponding description of the present disclosure. Therefore, the terms used in the present disclosure should be defined not simply by their apparent name but based on their meaning and context throughout the present disclosure.

It should be understood that the singular expression includes the plural expression unless the context clearly indicates otherwise. In the present disclosure, the terms "comprises" or "have" specify the presence of stated features, numerals, steps, operations, components, parts, or a combination thereof, but do not preclude the presence or addition of one or more other features, numerals, steps, operations, components, parts, or a combination thereof.

In what follows, embodiments of the present disclosure will be described in detail with reference to appended drawings. Throughout the specification, the same or corresponding constituting element is assigned the same reference number, and repeated descriptions thereof will be omitted.

Figure 1:
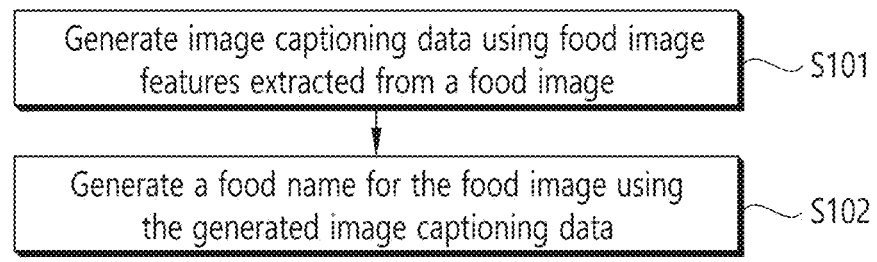
FIG. 1 illustrates a method for analyzing food using image captioning according to one embodiment of the present disclosure.

FIG. 1 illustrates a method for analyzing food using image captioning according to one embodiment of the present disclosure.

As shown in FIG. 1, in the S101 step, an apparatus for analyzing food using image captioning according to one embodiment of the present disclosure generates image captioning data using food image features extracted from a food image. Here, the apparatus for analyzing food may generate image captioning data from a food image using an encoder and decoder pair.

In the S102 step, the apparatus for analyzing food using image captioning according to one embodiment of the present disclosure generates a food name for a food image using the generated image captioning data.

According to embodiments, the image captioning data may include at least one of food ingredient information and food recipe information. The apparatus for analyzing food may generate a food name for a food image using image captioning data including at least one of the food ingredient information and food recipe information.

In one embodiment, the apparatus for analyzing food may generate image captioning data including food ingredients using food image features extracted from food images.

In another embodiment, the apparatus 100 for analyzing food may infer food ingredients using food image features extracted from a food image and generate image captioning data including a food recipe for the food image using the inferred food ingredients; one embodiment of the apparatus for analyzing food performing the operation above will be described with reference to FIG. 2.

Figure 2:
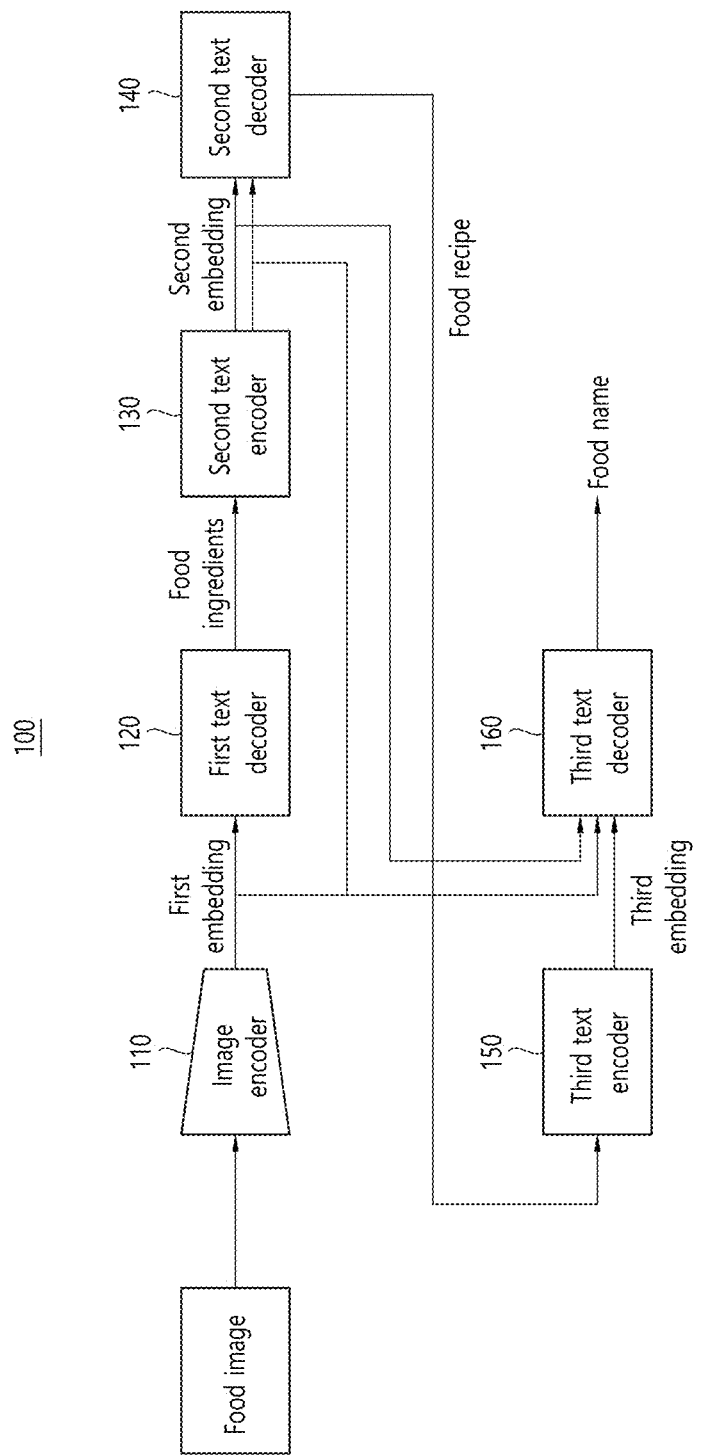
FIG. 2 illustrates an operation of an apparatus for analyzing food using image captioning according to one embodiment of the present disclosure.

FIG. 2 illustrates an operation of an apparatus for analyzing food using image captioning according to one embodiment of the present disclosure.

As shown in FIG. 2, the apparatus for analyzing food 100 using image captioning according to one embodiment of the present disclosure comprises an image encoder 110, a first text decoder 120, a second text encoder 130, a second text decoder 140, a third text encoder 150 and a third text decoder 160. The image encoder 110, the first text decoder 120, the second text encoder 130, the second text decoder 140, the third text encoder 150, and the third text decoder 160 may be executed by a processor included in the apparatus 100 for analyzing food. However, not all of the constituting elements shown in the figure are essential constituting elements. The apparatus 100 for analyzing food may be implemented using a larger or smaller number of constituting elements than shown in the figure.

In what follows, a detailed structure and operation of each constituting element of the apparatus 100 for analyzing food of FIG. 2 will be described.

The image encoder 110 receives a food image to be analyzed and extracts features of the input food image as the first embedding. Here, the first embedding has features of the food image.

Then, the first text decoder 120 first infers food ingredients in the food image using the first embedding extracted by the image encoder 110. In other words, the first text decoder 120 may infer food ingredients used for the food included in the food image.

Meanwhile, the second text encoder 130 receives food ingredients inferred by the first text decoder 120. The second text encoder 130 extracts the second embedding having food ingredient features using the input food ingredients.

Then, the second text decoder 140 receives a combination of the first embedding having food image features extracted from the image encoder 110 and the second embedding extracted from the second text encoder 130. The second text decoder 140 generates a food recipe for the food image using the first embedding and the second embedding. At this time, the second text decoder 140 may infer food recipe information step by step but generate the whole food recipe for the food image by inferring current recipe information from previously inferred recipe information. Through the operation, the second text decoder 140 may know the whole food recipe information for the food image.

Meanwhile, the third text encoder 150 receives the food recipe generated by the second text decoder 140. The third text encoder 150 extracts the third embedding having the input food recipe features.

The third text decoder 160 receives the third embedding extracted from the third text encoder 150 and generates a food name for the food image.

As described above, the apparatus 100 for analyzing food according to another embodiment of the present disclosure of FIG. 2 infers food ingredients for a food image using image captioning suitable for the food domain and generate a food recipe and a food name one after another. The apparatus 100 for analyzing food does not simply change the model using conventional image captioning and does not immediately output a food name as a caption. The apparatus 100 for analyzing food may generate a more accurate food name by performing a process of sequentially generating captions for food ingredients, a food recipe (e.g., descriptions of a food cooking process), and a food name.

Alternatively, the apparatus 100 for analyzing food using image captioning according to another embodiment of the present disclosure may generate a food name by performing a process of generating captions in order of food ingredients and a food name.

Alternatively, the apparatus 100 for analyzing food using image captioning according to yet another embodiment of the present disclosure may generate a food name by performing a process of generating captions in order of a food recipe (e.g., descriptions of a food cooking process) and a food name.

Figure 3:
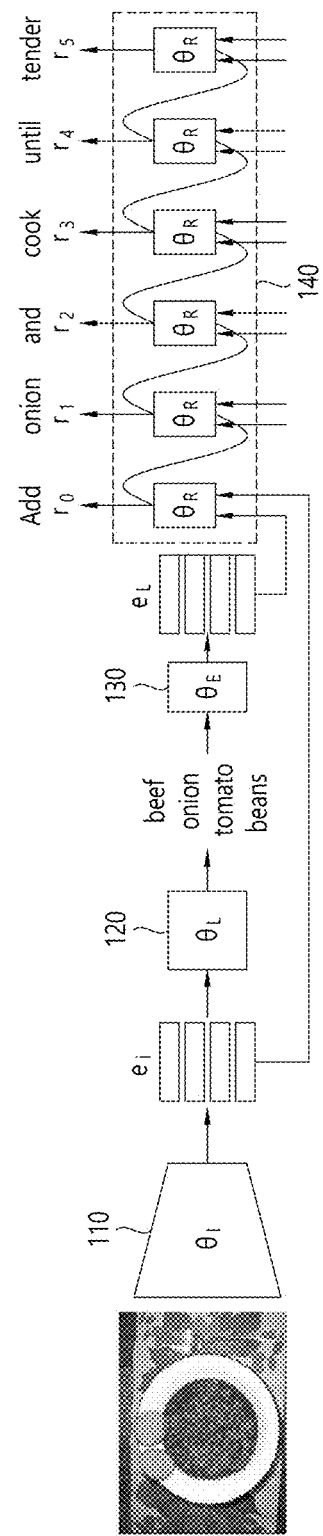
FIG. 3 illustrates an operation of estimating food ingredients and an operation of generating a food recipe according to one embodiment of the present disclosure.

FIG. 3 illustrates an operation of estimating food ingredients and an operation of generating a food recipe according to one embodiment of the present disclosure.

As shown in FIG. 3, the image encoder 110 of the apparatus 100 for analyzing food according to one embodiment of the present disclosure is denoted as $\theta_I$ block. The image encoder 110 extracts the first embedding $e_i$ having image features of an input food image.

In FIG. 3, the first text decoder 120 is denoted as $\theta_L$ block. The first text decoder 120 infers food ingredients (e.g., beef, onion, tomato, and beans) for the food image using the first embedding $e_i$.

In FIG. 3, the second text encoder 130 is denoted as $\theta_E$ block. The second text encoder 130 extracts the second embedding $e_L$ having food ingredient features using the food ingredients (e.g., beef, onion, tomato, and beans).

In FIG. 3, the second text decoder 140 is denoted as a block in which a plurality of $\theta_R$ blocks are combined. The second text decoder 140 receives a combination of the first embedding $e_I$ having food image features and the second embedding $e_L$ having food ingredient features. For example, the second text decoder 140 uses the first embedding $e_I$ and the second embedding $e_L$ to generate a series of food recipes "Add onion and cook until tender" comprising "$r_0$=Add," "$r_1$=onion," "$r_2$=and," "$r_3$=cook," "$r_4$=until," and "$r_5$=tender." At this time, the second text decoder 140 may generate a food recipe by considering the first embedding $e_I$, the second embedding $e_L$, and the recipe information inferred from previous food cooking steps ($r_0$, $r_1$, $r_2$, $r_3$, $r_4$, $r_5$). Here, the recipe information represents consecutive cooking information.

Figure 4:
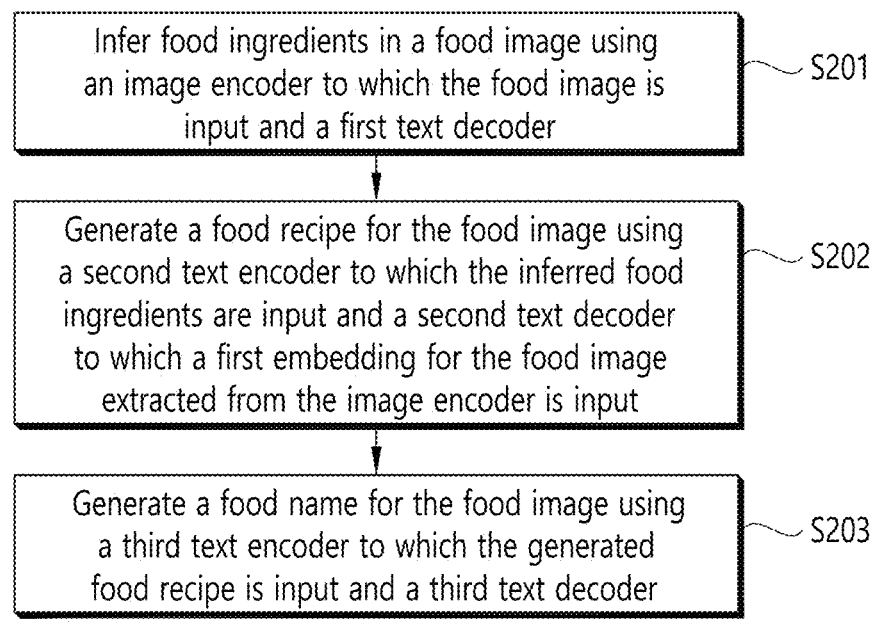
FIG. 4 illustrates a method for analyzing food using image captioning according to another embodiment of the present disclosure.

FIG. 4 illustrates a method for analyzing food using image captioning according to another embodiment of the present disclosure.

As shown in FIG. 4, in the S201 step, the apparatus 100 for analyzing food using image captioning according to one embodiment of the present disclosure infers food ingredients from a food image using the image encoder 110 to which the food image is input and the first text decoder 120.

In the S202 step, the apparatus 100 for analyzing food using image captioning according to one embodiment of the present disclosure generates a food recipe for the food image using the second text encoder 130 to which inferred food ingredients are input and the second text decoder 140 to which food image features extracted from the image encoder 110 are input.

In the S203 step, the apparatus 100 for analyzing food using image captioning according to one embodiment of the present disclosure generates a food name for the food image using the third text encoder 150 to which the generated food recipe is input and the third text decoder 160.

As described above, the apparatus 100 for analyzing food using image captioning according to one embodiment of the present disclosure may infer food ingredients from a food image using image captioning and generate a food recipe and a food name. The apparatus 100 for analyzing food may sequentially perform the operations of inferring food ingredients using the image encoder 110 and the first text decoder 120 for each process, generating a food recipe using the second text encoder 130 and the second text decoder 140, and generating a food name using the third text encoder 150 and the third text decoder 160.

Figure 5:
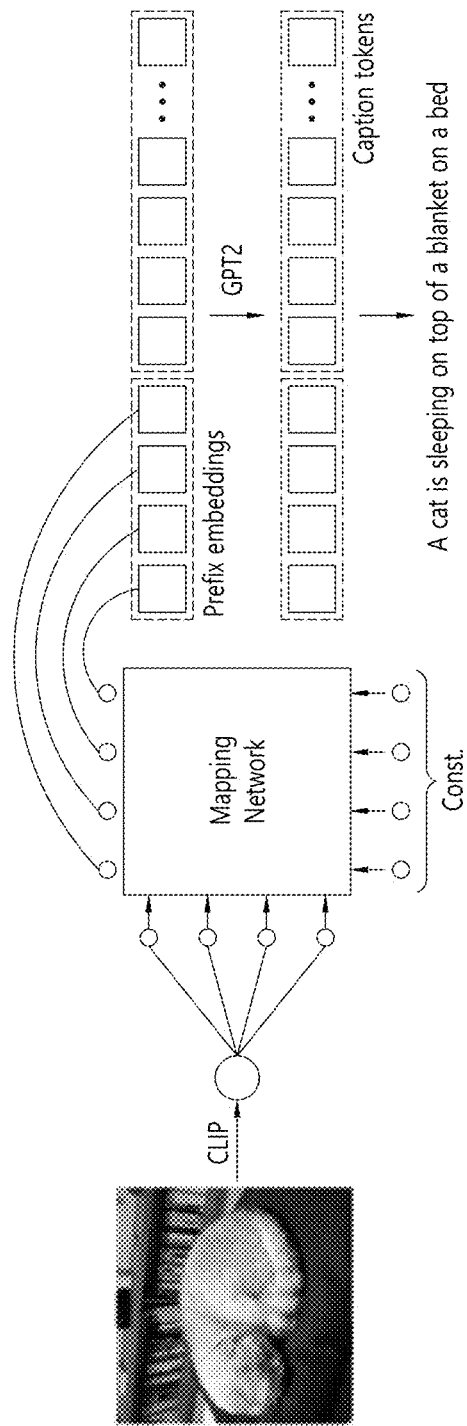
FIG. 5 illustrates an operation of learning an image model and a text model according to one embodiment of the present disclosure.

FIG. 5 illustrates an operation of learning an image model and a text model according to one embodiment of the present disclosure.

In the apparatus 100 for analyzing food using image captioning according to one embodiment of the present disclosure, the performance of the image encoder 110, each text encoder, and each text decoder exert considerable influences on the operation of inferring food ingredients, the operation of generating a food recipe, and the operation of generating a food name.

To improve the performance of the operations of inferring food ingredients, generating a food recipe, and generating a food name, the image encoder 110, the first text decoder 120, the second text encoder 130, the second text decoder 140, the third text encoder 150, and the third text decoder 160 according to one embodiment of the present disclosure are learned by contrastive learning based on contrastive loss.

Through the learning, the apparatus 100 for analyzing food may extract the image embeddings to be determined that the text model has high expressive power.

Therefore, the apparatus 100 for analyzing food using image captioning according to one embodiment of the present disclosure learns an image model and a text model by employing the Contrastive Language-Image Pre-learning (CLIP) structure, then brings the corresponding weights, and newly learns the weights in a model incorporating the image encoder 110, the first text decoder 120, the second text encoder 130, the second text decoder 140, the third text encoder 150, and the third text decoder 160. Here, the CLIP model is learned using the image encoder and the text encoders according to the contrastive learning scheme through contrastive loss. Therefore, since the apparatus 100 for analyzing food using image captioning according to one embodiment of the present disclosure uses the image encoder and text encoders according to the CLIP model, image embeddings may be extracted to have high expressive power even in terms of text model.

In the case of learning the CLIP model, learning proceeds with contrastive pre-learning. In the CLIP model, different classes (e.g., a pair of an image and text) are put in one batch, and learning is then performed with contrastive loss. When learning is performed in this manner, the embedding space extracted by the text encoder and the image encoder becomes diverse and wide. If food image A and food text A of the same class form a pair in the embedding space extracted by the text encoder and the image encoder, the two embeddings become close in the embedding space. Conversely, if food image A and food text B belonging to different classes are given, the two non-paired embeddings move away from each other in the embedding space, which enriches the whole embedding space and at the same time, fully mixes the information on the image and the information on the text. Therefore, the apparatus 100 for analyzing food using image captioning according to one embodiment of the present disclosure may increase the performance by utilizing the structure of the image encoder and text encoder learned as described above in the food name generation model. For example, the image encoder of the CLIP model may be applied to the image encoder 110 of the apparatus 100 for analyzing food, and the text encoder of the CLIP model may be applied to the second text encoder 130 and the third text encoder 150 of the apparatus 100 for analyzing food. In other words, representation performance may be improved.

The apparatus 100 for analyzing food uses the structure of the image encoder and the text encoder and weights learned through the contrastive pre-learning of the CLIP model for the image encoder 110 and the first text decoder 120 of a food ingredient inference model; the second text encoder 130 and the second text decoder 140 of a food recipe generation model; and the third text encoder 150 and the third text decoder of a food name generation model 160. Since the apparatus 100 for analyzing food uses a model learned through the CLIP model, the representation performance is very high, and it is possible to increase the performance of the food name generation model.

Figure 6:
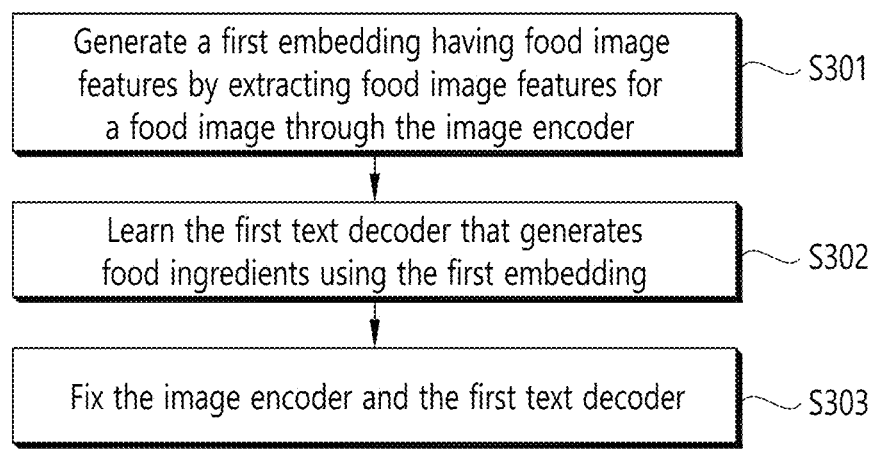
FIG. 6 illustrates an operation of learning a food ingredient model according to one embodiment of the present disclosure.

FIG. 6 illustrates an operation of learning a food ingredient model according to one embodiment of the present disclosure.

In the S301 step, the apparatus 100 for analyzing food may extract food image features, which describe the overall information on the food image, through the image encoder 110 and generate a first embedding of 768 dimensions having the food image features. The image encoder may be built on convolutional neural networks (CNNs).

In the S302 step, the apparatus 100 for analyzing food may use the first embedding to learn the first text decoder 120 for generating food ingredients. Here, the first text decoder 120 may have a transformer structure.

In the S303 step, the apparatus for analyzing food may fix the image encoder 110 and the first text decoder 120. After that, the image encoder 110 and the first text decoder 120 may operate again from the second learning after being fixed.

Figure 7:
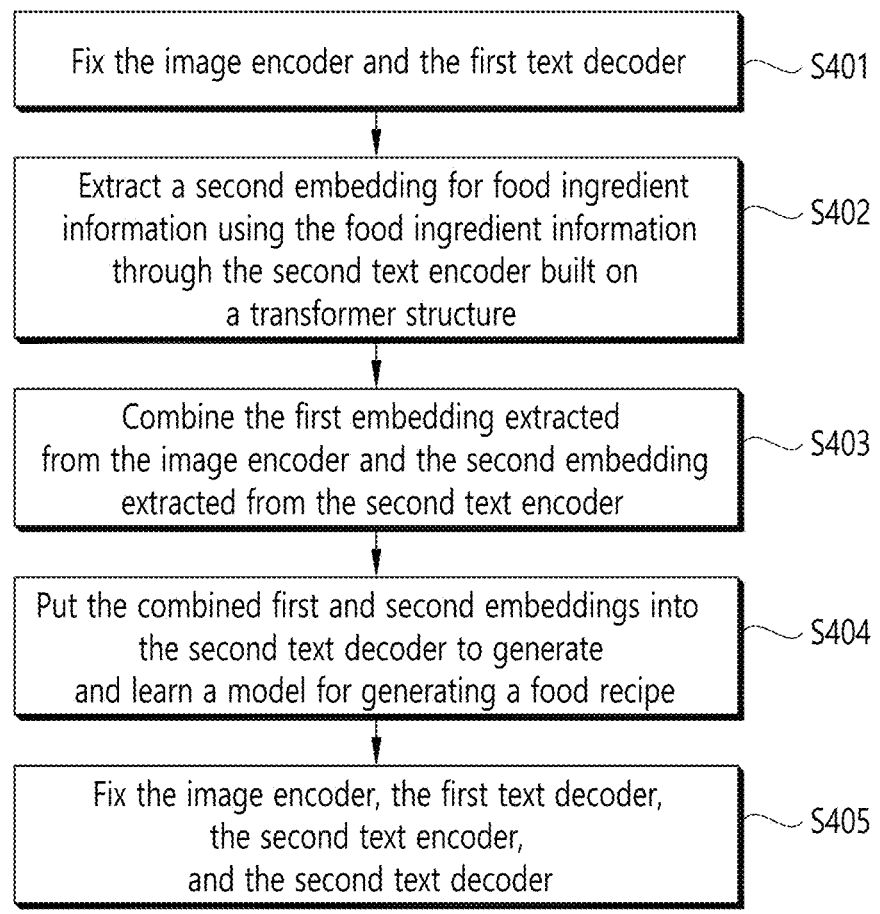
FIG. 7 illustrates an operation of learning a food cooking model according to one embodiment of the present disclosure.

FIG. 7 illustrates an operation of learning a food cooking model according to one embodiment of the present disclosure.

In the S401 step, the apparatus 100 for analyzing food may fix the image encoder 110 and the first text decoder 120.

In the S402 step, the apparatus 100 for analyzing food may extract a second embedding of 768 dimensions for the food ingredient information using the food ingredient information through the second text encoder 130 built on a transformer structure.

In the S403 step, the apparatus for analyzing food may combine the first embedding of 768 dimensions extracted from the image encoder 110 and the second embedding of 768 dimensions extracted from the second text encoder 130.

In the S404 step, the apparatus for analyzing food may put the combined first and second embeddings into the second text decoder 140 to generate and learn a model for generating a food recipe. Here, the second text encoder 130 and the second text decoder 140 may have a transformer-based structure.

In the S405 step, the apparatus for analyzing food may fix the image encoder 110, the first text decoder 120, the second text encoder 130, and the second text decoder 140.

Figure 8:
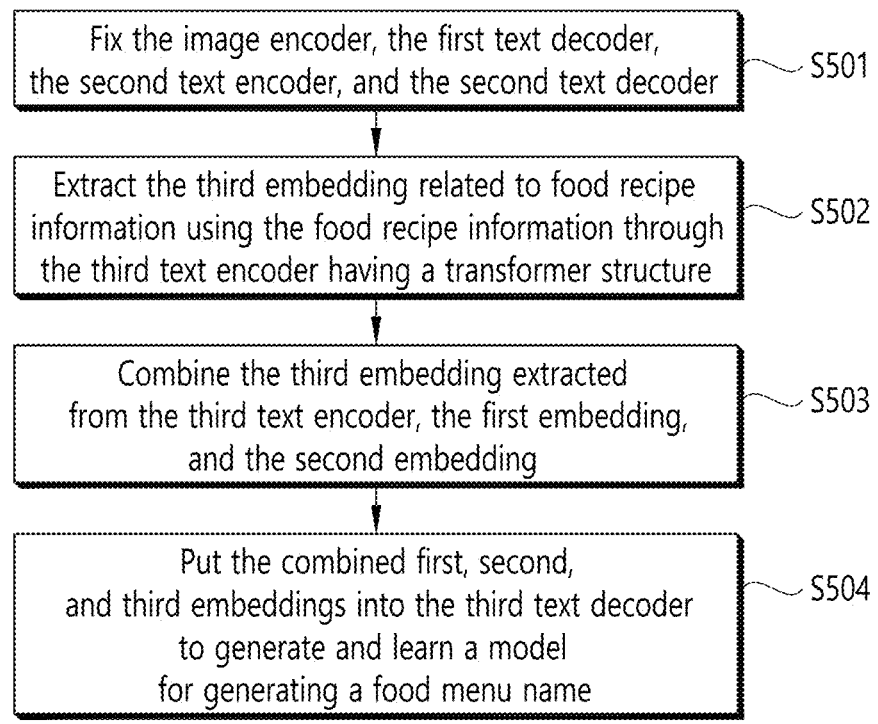
FIG. 8 illustrates an operation of learning a food name model according to one embodiment of the present disclosure.

FIG. 8 illustrates an operation of learning a food name model according to one embodiment of the present disclosure.

In the S501 step, the apparatus 100 for analyzing food may fix the image encoder 110, the first text decoder 120, the second text encoder 130, and the second text decoder 140.

In the S502 step, the apparatus 100 for analyzing food may extract the third embedding of 1536 (=768*2) dimensions related to the food recipe information using the food recipe information through the third text encoder 150 having a transformer structure.

In the S503 step, the apparatus 100 for analyzing food may combine the third embedding extracted from the third text encoder 150, the first embedding extracted from the image encoder 110, and the second embedding extracted from the second text encoder 130.

In the S504 step, the apparatus 100 for analyzing food may put the combined first, second, and third embeddings into the third text decoder 160 to generate and learn a model for generating a food menu name. Here, the third text encoder 150 and the third text decoder 160 may have a transformer-based structure.

Figure 9:
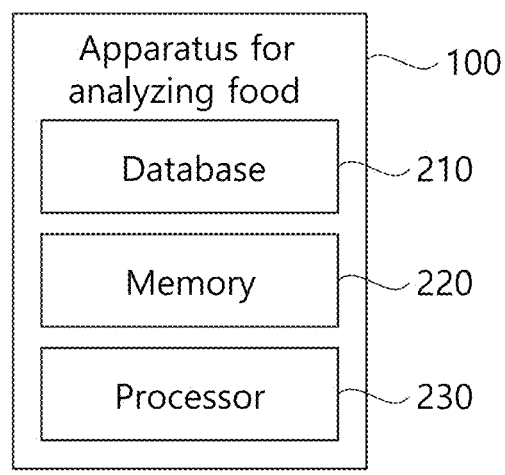
FIG. 9 illustrates a structure of an apparatus for analyzing food using image captioning according to one embodiment of the present disclosure.

FIG. 9 illustrates a structure of an apparatus for analyzing food using image captioning according to one embodiment of the present disclosure.

As shown in FIG. 9, the apparatus 100 for analyzing food using image captioning according to one embodiment of the present disclosure includes a database 210, a memory 220, and a processor 230. However, not all of the constituting elements shown in the figure are essential constituting elements. The apparatus 100 for analyzing food using image captioning according to one embodiment of the present disclosure may be implemented using a larger or smaller number of constituting elements than shown in the figure.

In what follows, a detailed structure and operation of each constituting element of the apparatus 100 for analyzing food using image captioning according to one embodiment of the present disclosure of FIG. 9 will be described.

The database 210 stores a plurality of food images which are pre-learning targets. The database 210 may include a food model related to food analysis using image captioning.

The memory 220 stores one or more programs related to food analysis using image captioning.

The processor 230 executes one or more programs stored in the memory 220. The processor 230 generates image captioning data using food image features extracted from a food image and generates a food name for the food image using the generated image captioning data.

According to embodiments, the processor 230 may generate image captioning data including food ingredients using food image features extracted from the food image.

According to embodiments, the processor 230 may infer food ingredients using food image features extracted from the food image and generate image captioning data including food recipes for the food image using the inferred food ingredients.

According to embodiments, the processor 230 may infer food ingredients for the food image using the image encoder 110 to which the food image is input and the first text decoder 120, generate a food recipe for the food image using the second text encoder 130 to which the inferred food ingredients are input and the second text decoder 140 to which food image features extracted from the image encoder 110 are input, and generate a food name for the food image using the third text encoder 150 to which the generated food recipe is input and the third text decoder 160.

According to embodiments, the processor 230 may extract a first embedding having food image features through the image encoder 110 to which the food image is input and infer food ingredients for the food image by inputting the extracted first embedding to the first text decoder 120.

According to embodiments, the processor 230 may extract a second embedding having food ingredient features through the second text encoder 130 to which the inferred food ingredients are input, generate a food recipe for the food image by combining the extracted first embedding having food image features and the extracted second embedding, inputting the combination to the second text decoder 140, and using recipe words inferred from previous steps.

According to embodiments, the processor 230 may extract a third embedding having food recipe features through the third text encoder 150 to which the generated food recipe is input and generate a food name for the food image by combining the extracted first, second, and third embeddings and inputting the combination to the third text decoder 160.

The image encoder 110, the second text encoder 130, and the third text encoder 150 may be pre-learned using contrastive learning based on contrastive cost.

According to embodiments, the image encoder 110, the second text encoder 130, and the third text encoder 150 may be learned so that a triplet of the first to third embeddings for the same food image, food ingredient, and food recipe is more similar to each other than a triplet of embeddings for different food images, food ingredients, and food recipes. Alternatively, learning may be performed so that a pair of the first and second embeddings for the same food image and food ingredients forming a pair is more similar to each other than an embedding pair for different food images and food ingredients not forming a pair. Alternatively, learning may be performed so that a pair of the first and third embeddings for the same food image and food recipe forming a pair is more similar to each other than an embedding pair for different food images and food recipes not forming a pair.

According to embodiments, the processor 230 may analyze food nutrients in the food image using at least one of the inferred food ingredient, the generated food recipe, and the generated food name.

Meanwhile, when the processor executes a method, a non-transitory computer-readable storage medium may be provided for storing instructions used by the processor to execute the method, the method comprising generating image captioning data using food image features extracted from a food image; and generating a food name for the food image using the generated image captioning data.

Meanwhile, according to one embodiment of the present disclosure, various embodiments described above may be implemented by software including instructions stored in a machine (e.g., a computer) readable storage media. The machine is an apparatus capable of calling stored instructions from the storage medium and operating according to the instructions called, which may include an electronic device (for example, an electronic device (A)) according to the disclosed embodiments. When an instruction is executed by the processor, the processor may perform the function corresponding to the instruction directly or by using other constituting elements under the control of the processor. The instruction may include code generated or executed by a compiler or an interpreter. The machine-readable storage medium may be provided in the form of a non-transitory storage medium. Here, the term 'non-transitory' only indicates that the storage medium does not include a signal and is tangible but does not distinguish whether data are stored semi-permanently or temporarily.

Also, according to one embodiment of the present disclosure, the method according to various embodiments described above may be provided by being included in a computer program product. The computer program product may be traded between sellers and buyers as a commodity. The computer program product may be distributed in the form of a machine-readable storage medium (for example, a Compact Disc Read Only Memory (CD-ROM)) or online through an application store (for example, Play Store™). In the case of online distribution, at least part of the computer program product may be at least stored temporarily or generated temporarily in a server of the manufacturer, a server of the application store, or a storage medium such as a memory of a relay server.

Also, according to one embodiment of the present disclosure, various embodiments described above may be implemented in a recording medium that may be read by a computer or a machine similar thereto by using software, hardware, or a combination of both. In some cases, the embodiments of the present disclosure may be implemented within a processor itself. In the case of software implementation, the embodiments such as procedures and functions according to the present disclosure may be implemented by separate software modules. Each of the software modules may perform one or more functions and operations according to the present disclosure.

Meanwhile, the computer instructions for executing processing operations of the machine according to various embodiments described above may be stored in a non-transitory computer-readable medium. When executed by a processor of a specific machine, the computer instructions stored in the non-transitory computer-readable medium instruction the specific machine to perform processing operations for an apparatus according to the various embodiments described above. The non-transitory computer-readable medium refers to a medium that stores data semi-permanently and that may be read by a machine, rather than a medium that stores data for a short time period such as a register, a cache, and a memory. Specific examples of the non-transitory computer-readable medium include a CD, a DVD, a hard disk, a Bluray disk, a USB memory, a memory card, and a ROM.

Also, each of the constituting elements (for example, a module or a program) according to the various embodiments of the present disclosure may be composed of a single or multiple entities; and part of the corresponding sub-elements described above may be omitted, or another sub-element may be further included in the various embodiments. Alternatively or additionally, part of the constituting elements (for example, a module or a program) may be integrated into a single entity, and the functions executed by the respective constituting elements prior to the integration may be performed in the same manner or in a similar manner. The operations executed by a module, a program, or another constituting element according to the various embodiments may be performed in a sequential, parallel, or heuristic manner; or at least part of the operations may be performed in a different order or omitted, or another operation may be added to the operations.

Throughout the document, preferred embodiments of the present disclosure have been described with reference to appended drawings; however, the present disclosure is not limited to the embodiments above. Rather, it should be noted that various modifications of the present disclosure may be made by those skilled in the art to which the present disclosure belongs without leaving the technical scope of the present disclosure defined by the appended claims, and these modifications should not be understood individually from the technical principles or perspectives of the present disclosure.

What is claimed is:

1. A method for analyzing food executed by an apparatus for analyzing food, the method comprising:
   training an image encoder, a second text encoder, and a third text encoder using contrastive learning using a contrastive language-image pre-learning structure;
   generating image captioning data using food image features extracted from a food image,
   wherein the generating image captioning data extracts a first embedding having food image features through the image encoder to which the food image is input and generates image captioning data including food ingredients for the food image by inputting the extracted first embedding to the first text decoder, and wherein the generating image captioning data extracts a second embedding having food ingredient features through the second text encoder to which the inferred food ingredients are input and generates image captioning data including food recipes for the food image by combining the first embedding having the extracted food image features and the extracted second embedding and inputting the combination to the second text decoder; and
   generating a food name for the food image using the generated image captioning data,
   wherein the generating a food name extracts a third embedding having food recipe features through a third text encoder to which the generated food recipe is input and generates a food name for the food image by combining the extracted first, second, and third embeddings and inputting the combination to the third text decoder.

2. The method of claim 1, wherein the generating image captioning data generates image captioning data including food ingredients using food image features extracted from the food image.

3. The method of claim 1, wherein the generating image captioning data infers food ingredients using food image features extracted from the food image and generates image captioning data including food recipes for the food image using the inferred food ingredients.

4. The method of claim 1, wherein the image encoder, the second text encoder, and the third text encoder are learned so that a triplet of the first to third embeddings for the same food image, food ingredient, and food recipe is more similar to each other than a triplet of embeddings for different food images, food ingredients, and food recipes.

5. Method of claim 3, further including analyzing food nutrients in the food image using at least one of the inferred food ingredient, the generated food recipe, and the generated food name.

6. An apparatus for analyzing food using image captioning comprising:
   a memory storing one or more programs; and
   a processor executing the one or more programs stored,
   wherein the processor is configured to:
   train an image encoder, a second text encoder, and a third text encoder using contrastive learning using a contrastive language-image pre-learning structure;
   generate image captioning data using food image features extracted from a food image,
   wherein the processor extracts a first embedding having food image features through the image encoder to which the food image is input and generates image captioning data including food ingredients for the food image by inputting the extracted first embedding to the first text decoder, and wherein the processor extracts a second embedding having food ingredient features through the second text encoder to which the inferred food ingredients are input and generates image captioning data including food recipes for the food image by combining the first embedding having the extracted food image features and the extracted second embedding and inputting the combination to the second text decoder; and
   generate a food name for the food image using the generated image captioning data,
   wherein the processor extracts a third embedding having food recipe features through the third text encoder to which the generated food recipe is input and generates a food name for the food image by combining the extracted first, second, and third embeddings and inputting the combination to the third text decoder.

7. The apparatus of claim 6, wherein the processor generates image captioning data including food ingredients using food image features extracted from the food image.

8. The apparatus of claim 6, wherein the processor infers food ingredients using food image features extracted from the food image and generates image captioning data including food recipes for the food image using the inferred food ingredients.

9. The apparatus of claim 6, wherein the image encoder, the second text encoder, and the third text encoder are learned so that a triplet of the first to third embeddings for the same food image, food ingredient, and food recipe is more similar to each other than a triplet of embeddings for different food images, food ingredients, and food recipes.

10. The apparatus of claim 8, wherein the processor analyzes food nutrients in the food image using at least one of the inferred food ingredient, the generated food recipe, and the generated food name.

* * * * *